(12) United States Patent
Bergeron (10) Patent No.: US 9,230,450 B1
(45) Date of Patent: Jan. 5, 2016

(54) SYSTEMS AND METHODS FOR DISTRIBUTED ADAPTIVE SIMULATOR TRAINING

(75) Inventor: Bryan P. Bergeron, Brookline, MA (US)

(73) Assignee: Accella Learning, Louisville, KY (US)

(*) Notice: Subject to any disclaimer, the term of this patent is extended or adjusted under 35 U.S.C. 154(b) by 678 days.

(21) Appl. No.: 13/200,781

(22) Filed: Sep. 30, 2011

(51) Int. Cl.
| | | |
|---|---|---|
| *G09B 19/00* | (2006.01) | |
| *G09B 19/24* | (2006.01) | |
| *G09B 9/00* | (2006.01) | |
| *G09B 7/00* | (2006.01) | |
| *G01T 1/00* | (2006.01) | |

(52) U.S. Cl.
CPC ........ *G09B 19/24* (2013.01); *G09B 7/00* (2013.01); *G09B 19/00* (2013.01); *G01T 1/00* (2013.01)

(58) Field of Classification Search
USPC .......................................... 434/350, 218, 379
See application file for complete search history.

(56) References Cited

U.S. PATENT DOCUMENTS

| | | | | |
|---|---|---|---|---|
| 4,685,122 | A * | 8/1987 | Deveson et al. | 379/90.01 |
| 2004/0158476 | A1 * | 8/2004 | Blessinger et al. | 705/1 |
| 2004/0232323 | A1 * | 11/2004 | Bosco et al. | 250/253 |
| 2008/0031435 | A1 * | 2/2008 | Kagaya et al. | 379/102.01 |
| 2009/0263770 | A1 * | 10/2009 | Ambrose | 434/218 |
| 2009/0263771 | A1 * | 10/2009 | Darois et al. | 434/218 |

OTHER PUBLICATIONS

"Fully interactive virtual handsets for mobile operators. Anytime. Anywhere." Mobile Complete. Oct. 25, 2010. Retrieved Aug. 19, 2013 from <URL: http://www.demoanywhere.com/pdf/DemoAnywhere.pdf>.*
"Keynote 2: User's Guide" Apple Computer, Inc. Mar. 21, 2005 (date retrieved through document properties). Retrieved Aug. 8, 2014 from <URL: http://manuals.info.apple.com/MANUALS/0/MA523/en_US/Keynote2_UserGuide.pdf>.*
"Tutorial: Use multiple choice in Keynote" iCreate. Sep. 17, 2009. Retrieved Aug. 8, 2014 from <URL: http://www.icreatemagazine.com/tips/tutorial-use-multiple-choice-in-keynote/>.*
"Solid-state relay". Wikipedia. Retrieved from the internet on Jul. 11, 2015 from <url:https://en.wikipedia.org/wiki/Solid-state_relay>.*

* cited by examiner

*Primary Examiner* — Sam Yao
*Assistant Examiner* — Peter J Alley
(74) *Attorney, Agent, or Firm* — Frost Brown Todd LLC (57) ABSTRACT

Simulation equipment can be integrated into courseware presented to a student using technology which, based on the native output of a system running the courseware, can generate control signals for the simulation equipment. Such signals could then be sent to the simulation equipment without requiring the designer of the courseware to create low level programming code to communicate directly with the simulation equipment itself.

11 Claims, 9 Drawing Sheets

SYSTEMS AND METHODS FOR DISTRIBUTED ADAPTIVE SIMULATOR TRAINING

INCORPORATION BY REFERENCE

This application incorporates by reference in its entirety the information from the computer program listing appendix submitted herewith, comprising the files listed in the table below:

| Name | Creation Date | Size |
| --- | --- | --- |
| DecoderProcessor.txt | Sep. 29, 2011 | 3,159 bytes |
| OpenSerialPort.txt | Sep. 29, 2011 | 1,075 bytes |
| Simulator.txt | Sep. 29, 2011 | 10,647 bytes |
| SimulatorSerial.txt | Sep. 29, 2011 | 2,276 bytes | on the compact disc submitted herewith. Two identical discs, each containing the files listed above are submitted herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention generally relates to simulators and software-aided training. Specific embodiments can be used to facilitate the learning of various devices and of their applications in various contexts.

2. Related Art

Strictly computer-based training, including adaptive training, in which materials are presented to the learner using text, graphics, sound, and other multimedia has inherent limitations. For example, without hands-on experiential learning, students may not grasp the subtleties of the proper use of a particular device. This is especially true when the learner has never seen or used the device in full context before. For example, cardiac defibrillators mounted in public areas and radiation survey meters are rarely used, but when they are needed in real-life situations, proper, expert-level operation is critical.

An approach to training people on the use of specific devices beyond traditional courseware is to use stand-alone or integrated simulators of the devices and/or of the environment. For example, a weapon, aircraft, or measuring instrument can be simulated. A simulated radiation probe could indicate the presence of radiation when none is actually present, for example. Similarly, simulated and/or real devices can be used to examine a simulated or real patient.

Many simulators are proprietary with closed architectures. They are designed to operate and interface with specific software applications and hardware drivers. As such, they cannot be integrated with simulators or with courseware from other vendors without significant low-level programming or reprogramming. This requires developers who are willing and able to write low-level, hardware-specific calls from courseware to direct the operation of simulators. Moreover, without communications between adaptive courseware and simulators, educators are unable to share and leverage information about specific learners that may be part of a learning management system (LMS).

As a result, there is a need for technology which can be used for purposes such as facilitating the integration of simulation and courseware systems.

SUMMARY

This document discloses various techniques that can be used to enable developers to integrate simulators and other hardware with courseware systems, including courseware that supports adaptive learning, often referred to as Intelligent Tutoring Systems (ITS). The software and associated hardware described here can be used to enable an author of an adaptive courseware to use audio or other output capabilities native to the courseware system to reconfigure one or more simulators in real time. The resulting distributed adaptive learning system can leverage data processing and data access made available through a stand-alone or networked cell phone, tablet, or other mobile or portable computing device, or desktop computer, using local or cloud storage.

As will be apparent to one of ordinary skill in the art in light of this disclosure, the teachings of this disclosure can be utilized in a variety of different implementations. Set forth herein are certain features which some such implementations may include. It should be understood that the implementations identified herein are intended to provide examples only of aspects of implementations which could be created based on this disclosure, and are not intended to indicate limits on potential implementations which are covered by the claims in this document or any other documents claiming the benefit of this document.

BRIEF DESCRIPTION OF THE DRAWINGS

The drawings and detailed description which follow are intended to be illustrative and are not intended to imply limitations on the scope of potential implementations of the disclosure set forth herein.

DETAILED DESCRIPTION

Figure 1:
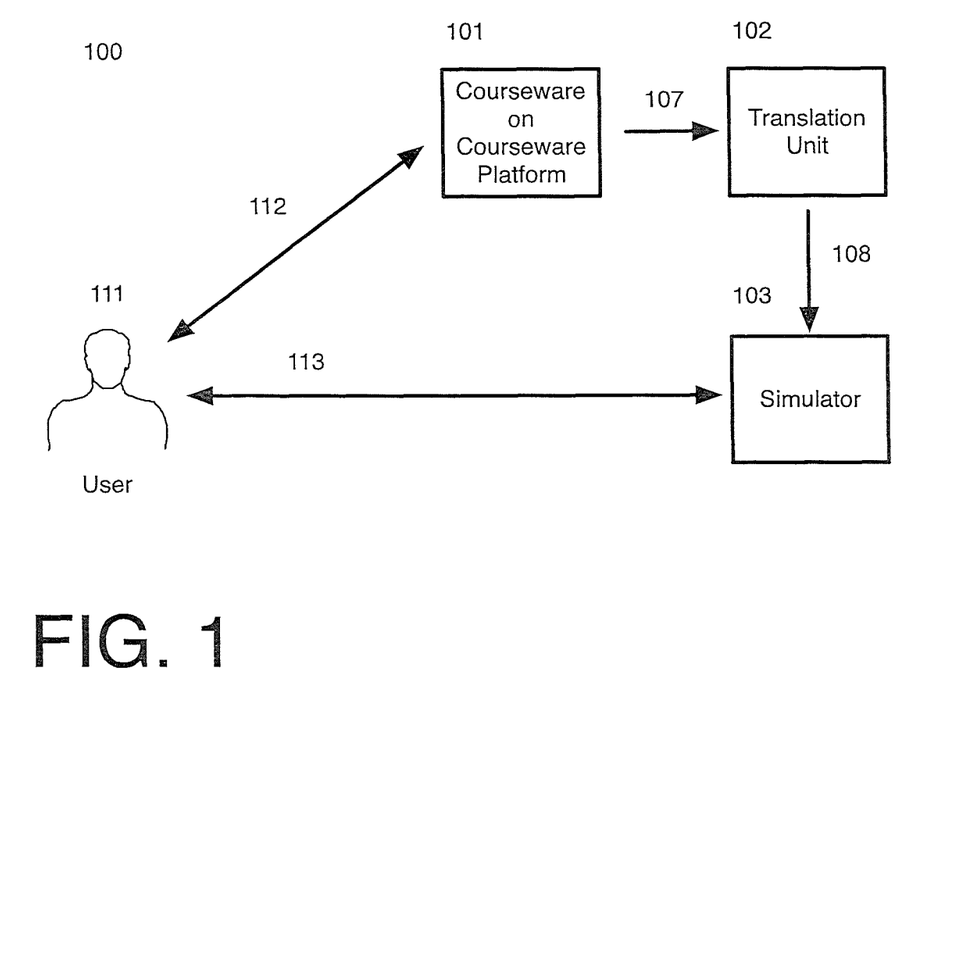
FIG. 1 is an exemplary high-level architecture of a system that could be implemented to enable one or more users to interact with courseware running on a courseware platform as well as interact with a simulator.

Turning now to the figures, FIG. 1 is an exemplary high-level architecture of a system [100] that could be implemented to enable one or more users [111] to interact [112] with courseware running on a courseware platform [101] as well as interact [113] with a simulator [103]. The simulator [103] is configured at runtime when native signals [107] from the courseware platform [101] are converted to control signals [108] by the translation unit [102]. This conversion of native signals into control signals can be used as a basis for leveraging ordinary courseware development tools and platforms to control potentially complex simulators. One skilled in the art should recognize that any output directed by the courseware could be used as the basis of the control signal, and that, depending on the platform and courseware development software, the native signal could consist of an audio signal, a colored area on the screen, printer output, LED or other signals, and variations in haptic output devices, such as a game controller. The native signal could be communicated in any suitable manner, including over wired or wireless links from the courseware platform [101] to the translation unit [102].

The courseware platform [101] could consist of a desktop PC, tablet computer, smart phone, handheld game console, or other multimedia-capable device with appropriate output capabilities. The courseware executing on this platform could be connected, via wired or wireless network, to an adaptive engine running on a courseware server or learning management system (not shown). This would enable the system to adapt the simulator [103] to the needs of the user, as in Intelligent Tutoring.

Figure 2:
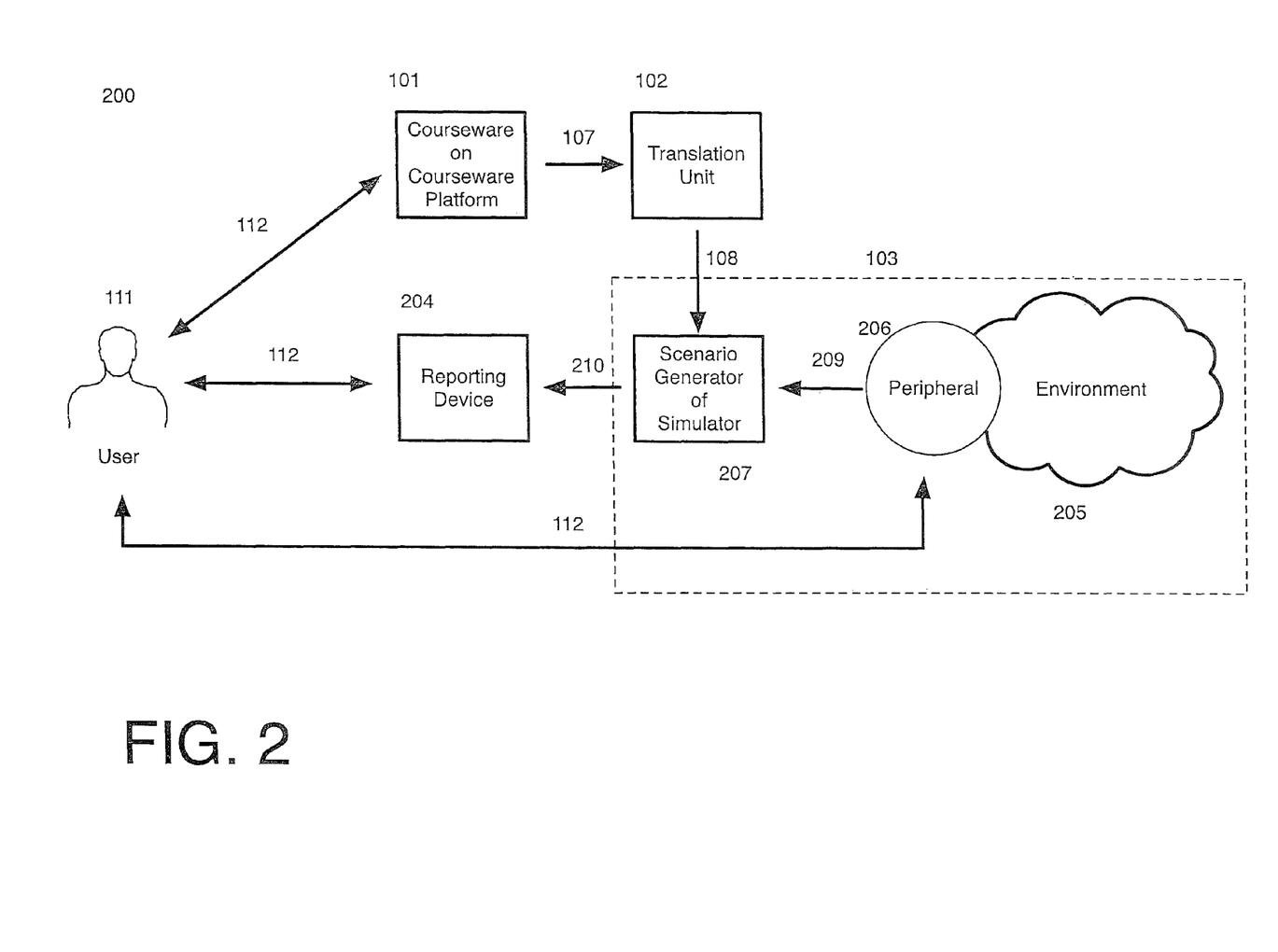
FIG. 2 depicts an exemplary generic high-level architecture of a system in which the user interacts with courseware executing on a courseware platform, interacts with an unmodified reporting device, such as an electronic instrument which would provide the user with (real or simulated) data collected by the peripheral, and interacts with a peripheral, such as a real or simulated probe or peripheral normally associated with the operation of the reporting device.

Turning now to FIG. 2, that figure depicts an exemplary generic high-level architecture of a system [200] in which the user [111] interacts with courseware executing on a courseware platform [101], interacts [112] with an unmodified reporting device [204], such as an electronic instrument which would provide the user with (real or simulated) data collected by the peripheral [206], and interacts [112] with a peripheral [206], such as a real or simulated probe or peripheral normally associated with the operation of the reporting device [204]. Native signals [107] played or generated by the courseware running on the courseware platform [101] are fed to the translation unit [102], and the resultant control signal [108] is used to dynamically configure the scenario generator [207] of a simulator [103]. This simulator [103] feeds normal device input signals [210] consistent with the current scenario to the reporting device [204]. This normal device input signal [210] is a function of the scenario defined by the control signal [108] and the data signal [209] from the peripheral [206] that is able to interact with its environment [205]. This one of many possible simulator configurations that could be employed based on the disclosure set forth herein.

Figure 3:
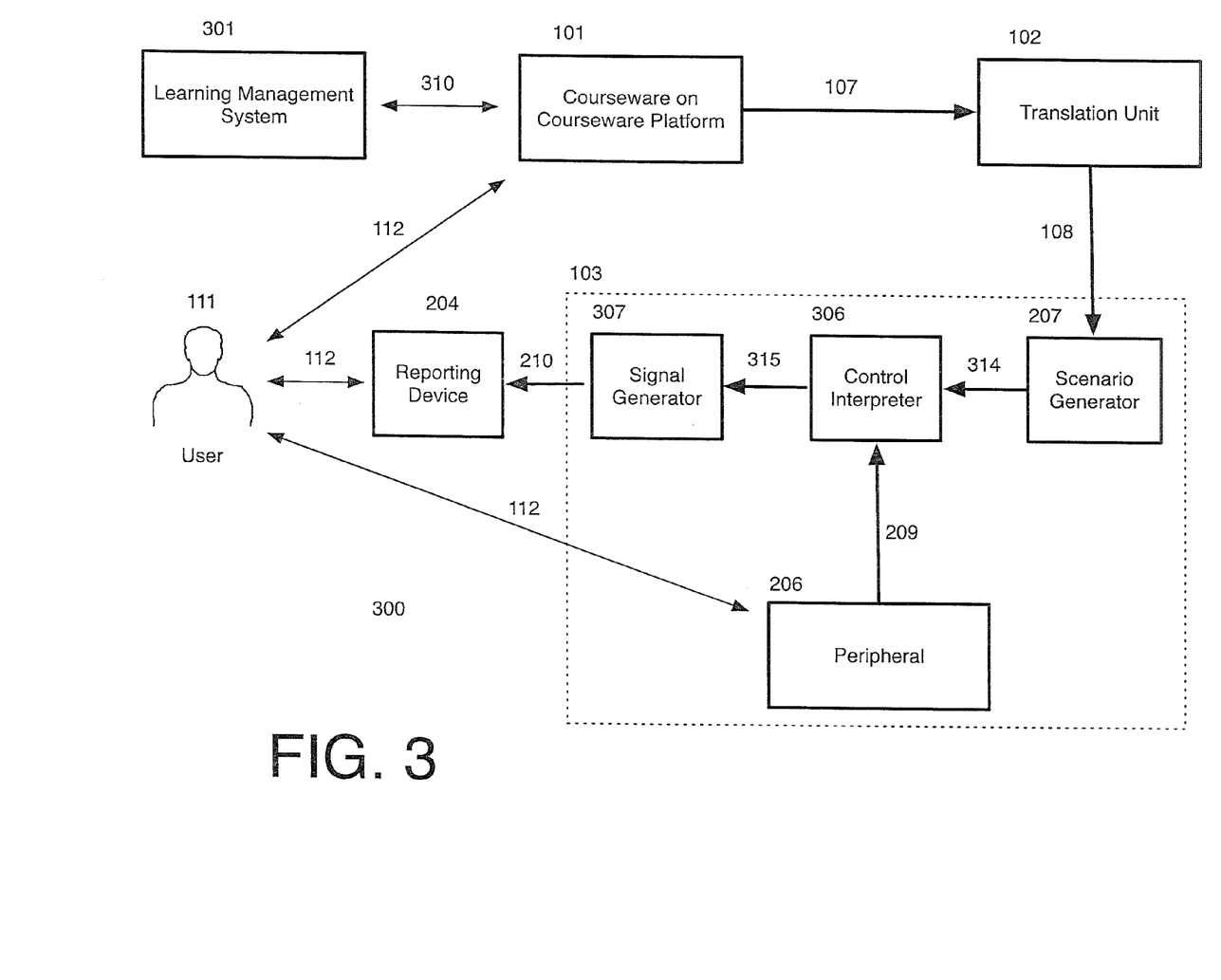
FIG. 3 depicts an exemplary generic high-level architecture of a system in which the user interacts with a courseware application executing on a processor, interacts with an unmodified reporting device, such as a measuring instrument, and interacts with the peripheral elements of a simulator.

Turning now to FIG. 3, that figure depicts an exemplary generic high-level architecture of a system [300] in which the user [111] interacts [112] with a courseware application executing on a processor [101], interacts [112] with an unmodified reporting device [204], such as a measuring instrument, and interacts [112] with the peripheral [206] elements of a simulator [103]. As shown in FIG. 3, the courseware on the courseware platform [101] could communicate bidirectionally [310] with a Learning Management System [301]. In some implementations, this Learning Management System [301] or LMS can both monitor the progress of the user within the courseware application on the courseware platform [101] and control the progress of the user through the courseware application.

In the course of working through the courseware, the user [111] causes the triggering of native signals [107] that are sent to the translation unit [102], which creates control signals [108] that define the operation of the scenario generator [207] component of the simulator [103]. The scenario generator [207] communicates [314] with the control interpreter [306], instructing it on how to interpret the signals [209] generated by the peripheral [206]. This communication [314] can take a variety of forms, such as a mask pattern that is logically anded with signals [209] generated by the peripheral [206], depending on the nature of the simulator [103]. The resultant interpretation signal [315] is communicated to the signal generator [307] of the simulator [103]. The signal generator then outputs a normal device input signal [210], which is sent to the reporting device [204], and, in a preferred embodiment is defined to appear as a typical signal generated by a real peripheral operating in a non-simulated environment. For example, if a real peripheral were designed to produce a decrease in resistance when exposed to a radioactive source, and the interpretation signal [315] from the control interpreter [306] indicates that the peripheral [206] is exposed to a simulated radiation source, then the signal generator [307] will provide a low resistance signal to the input of the reporting device [204]. Similarly, if the peripheral [206] typically responds to a given sample by generating a pulse train with a given frequency and amplitude, the signal generator [307] will generate such a train and communicate it to the reporting device [204].

Also, as shown in FIG. 3, the courseware application executing on a processor [101] can communicate [310] with a learning management system [301] that provides adaptive control of the courseware. Of course, adaptive control could also be self-contained in the courseware application executing on the courseware platform [101], or the adaptive control could come from some other networked device that does not qualify as a learning management system. For example, it could be a simple file server with menu system for users to select a course from a library of courseware, or it could be a sophisticated Learning Content Management System or LCMS.

In an illustrative example following the architecture of FIG. 3, the native signal [107] generated or played by the courseware application executing on the processor [101] is an audio signal, such as a standard dual-tone multi-frequency (DTMF) signal, which is composed of eight different frequency signals transmitted in pairs to represent 16 different numbers. Following with this example, the analog DTMF signals are decoded by a decoder and processor in the translation unit [102] and the resulting digital control signal [108] is sent to the simulator [103]. The decoding can be done simply by translating the DTMF signals into numbers using standard DTMF frequency decoding, though more complicated processing is also possible. For example, there could be a conversion table in the translation unit [102] which includes mappings between specific sounds and control signals to send to the simulator [103] (e.g., if the input sound is X, output control signal Y). As another example, there could be algorithms which are designed to generate a control signal [108] based on multiple DTMF signals (e.g., to accommodate cases where there are more control signals than DTMF signals, the translation unit [102] could be configured to represent the control signals as a set of N hexadecimal digits, and would translate a series of DTMF signals by mapping the first DTMF signal to the first hexadecimal digit, the second DTMF signal to the second hexadecimal digit, etc). As another example, there could be algorithms for error detection and correction. Other approaches are also possible and will be immediately apparent to those of ordinary skill in the art in light of this disclosure. Accordingly, the discussion above should be understood as being illustrative only, and not limiting.

Continuing with the illustrative example from the previous paragraph, once the control signals have been created, they would be sent to the simulator [103], and in the architecture of FIG. 3 to the scenario generator [207], a component of the simulator [103] that contains a processor and memory so that it can define the operation of the simulator [103] that, in this example, provides the sensor output of a peripheral [206] with which at least one user [111] interacts. As noted earlier, the user also interacts [112] with the unmodified reporting device [204]. The signal generator [307] generates a normal device input signal [210] as defined by the scenario generator [207] and the interpretation of the data signal [209] from the peripheral [206]. The interpretation of the data signal [209] from the peripheral [206] is modulated by the scenario generator [207]. For example, if the current scenario is such that a signal should be present at a given location, assuming the real or simulated sensor or peripheral [206] is positioned properly, then the control interpreter [306] will interpret a signal as present if it receives the appropriate data signal [209] from the peripheral [206]. Conversely, if the scenario defines absence of signal in a given location, then the control interpreter [306] will interpret the data signal [209] from the peripheral [206] as absent, even if signals are present.

Figure 4:
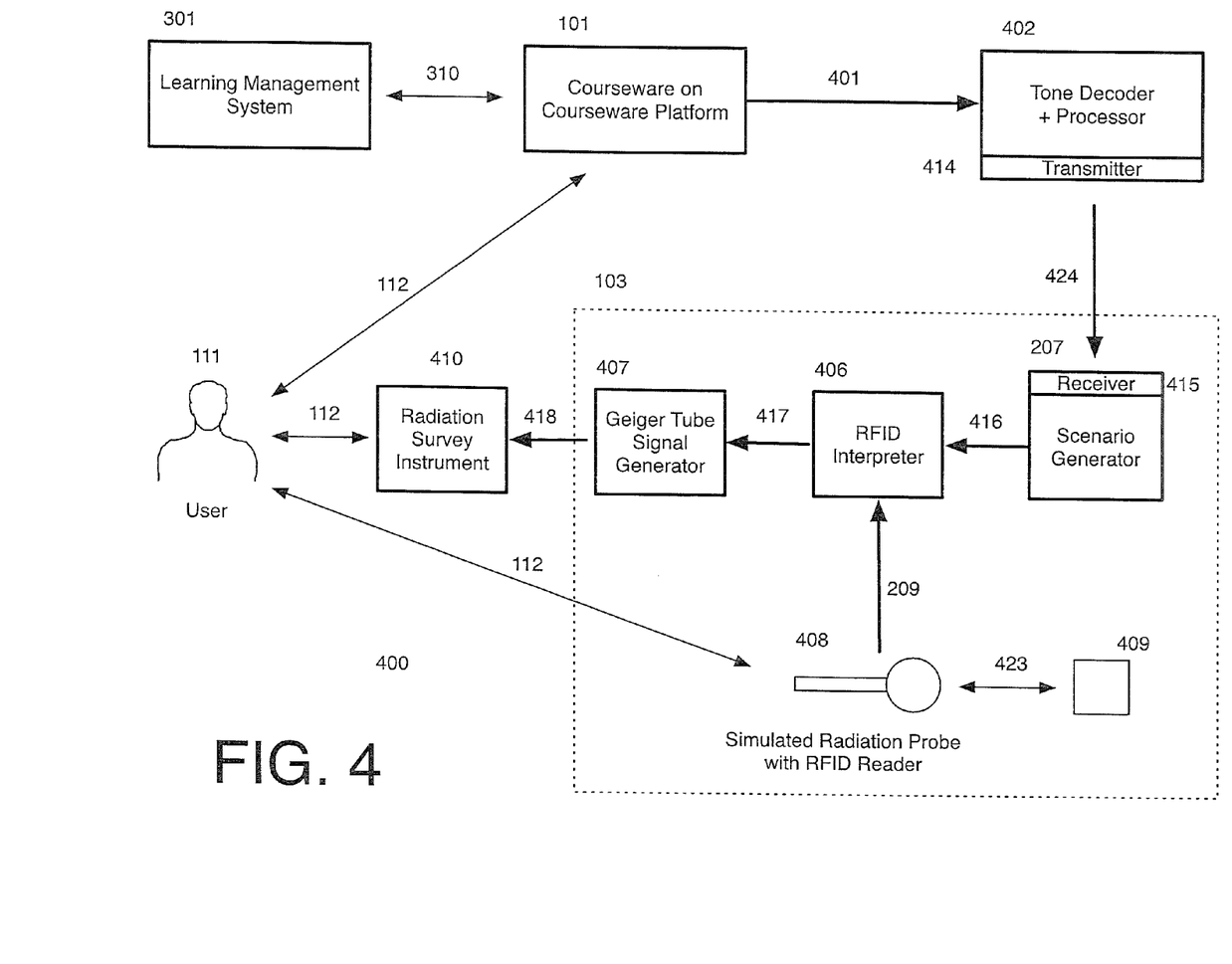
FIG. 4 provides an overview of a specific implementation following the architecture of FIG. 3 which could be created based on this disclosure in the field of training first responders on the proper use of a radiation survey meter.

Turning now to FIG. 4, that figure provides an overview of a specific implementation following the architecture of FIG. 3 which could be created based on this disclosure in the field of training first responders on the proper use of a radiation survey meter. As shown in FIG. 4, the user [111] can interact with three elements, either in turn or simultaneously, as the situation dictates and at the discretion of the user [111]. In this example, the user interacts [112] with a courseware application executing on a courseware platform [101], interacts [112] with a radiation survey instrument [410] (a specific example of a reporting device [204], and interacts [112] with a simulator [103], which includes a simulated radiation probe [408] (a specific example of a peripheral [206]) that outwardly appears to be a real radiation probe, but has an RFID (radio frequency identification) chip and associated circuitry instead of a Geiger-Mueller tube. In FIG. 4, as in FIG. 3, the courseware application on the courseware platform [101] communicates [310] with a Learning Management System [301], which monitors user actions within the courseware and directs the content delivery, thereby providing a degree of adaptability, as in Intelligent Tutoring Systems.

In this example system [400], user interactions [112] with the courseware on the courseware platform [101] result in the generation or playback of audio signals [401] (a specific example of a native signal [107]) that are communicated to a tone decoder and processor [402] (a specific example of a translation unit [102]), which processes the analog audio signal [401] into a digital signal [424] (a specific example of a control signal [108]) that is transmitted by a transmitter element [414] that is connected to tone decoder and processor [402]. This digital signal [424] is picked up by a receiver element [415] within the simulator [103]. This transmitter-receiver pair [414][415] may operate wirelessly, through a channel such as a radio frequency or optical link, or wired, through channels such as copper wire or optical fiber.

The digital signal [424] instructs the scenario generator [207] to generate the scenario dictated by the audio signal [401] from the courseware. The RFID Interpreter [406] (a specific example of a control interpreter [306]) responds to data signals [209] from the simulated radiation probe [408], as a function of the current scenario. That is, the RFID reader [408] reads [423] an RFID tag [409] (a specific example of a portion of an environment [205]) and sends an identification of that tag as a data signal [209] to the RFID interpreter [406] (a specific example of a control interpreter [306]). How and whether the detection of the RFID tag [409] is equated to the simulated detection of radioactivity is determined the RFID Interpreter's [406] evaluation of the current scenario. In FIG. 4, the RFID Interpreter [406] is used to decide if the signal received from the simulated radiation probe [408] if any, should be acted on or ignored. In the event that the RFID interpreter [406] determines that simulated radiation detection is appropriate, the interpreter [406] communicates [417] an appropriate level of radiation that should be simulated by the Geiger tube signal generator [407] (a specific example of the signal generator [307]). The output of the Geiger tube signal generator [418] (a specific example of the normal device input signal [210]) serves as input to the radiation survey meter [410].

Figure 5:
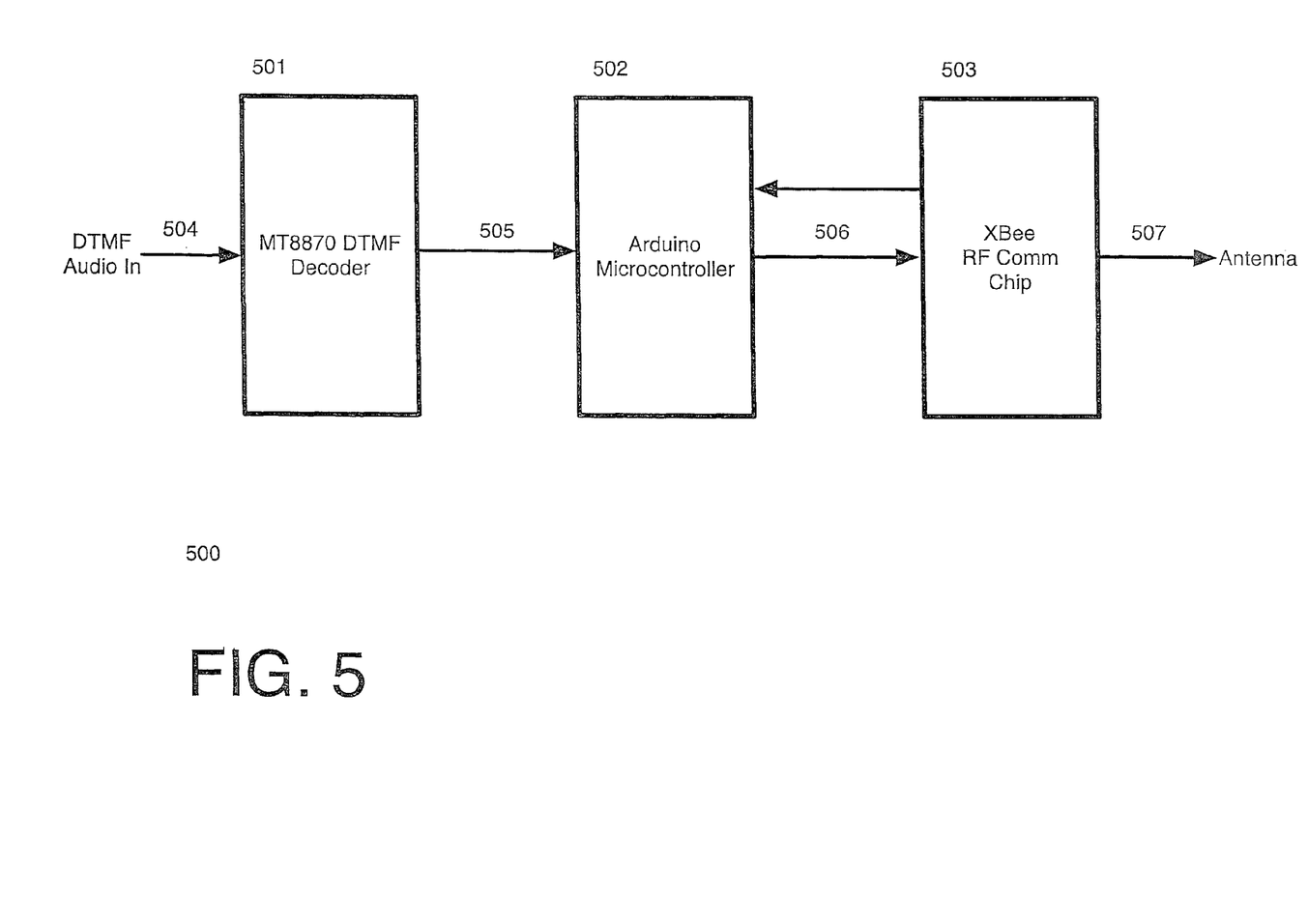
FIG. 5 depicts an exemplary architecture for a device such as the decoder+processor and transmitter of FIG. 4 which could be used to control the scenario generator.

FIG. 5 depicts an exemplary architecture [500] for a device such as the decoder+processor [402] and transmitter [414] of FIG. 4 which could be used to control the scenario generator [207]. An analog DTMF audio signal [401] is sent [504] to and processed by a DTMF decoder [501], such as one of a number of decoder chips on the market. The output of this decoder [505] is fed to a microcontroller [502], which communicates [506] with a wireless transceiver [503] which is connected [507] to an antenna. Of course any comparable decoder, microcontroller and communications chip could be used in place of the specific examples used here. Assuming an Arduino microcontroller, the chip is programmed with standard Arduino coding tools. In a preferred embodiment, the main element of this code is a lookup table that equates DTMF decoder codes (or other native signals, in embodiments which do not use DTMF codes) with predefined scenarios.

Figure 6:
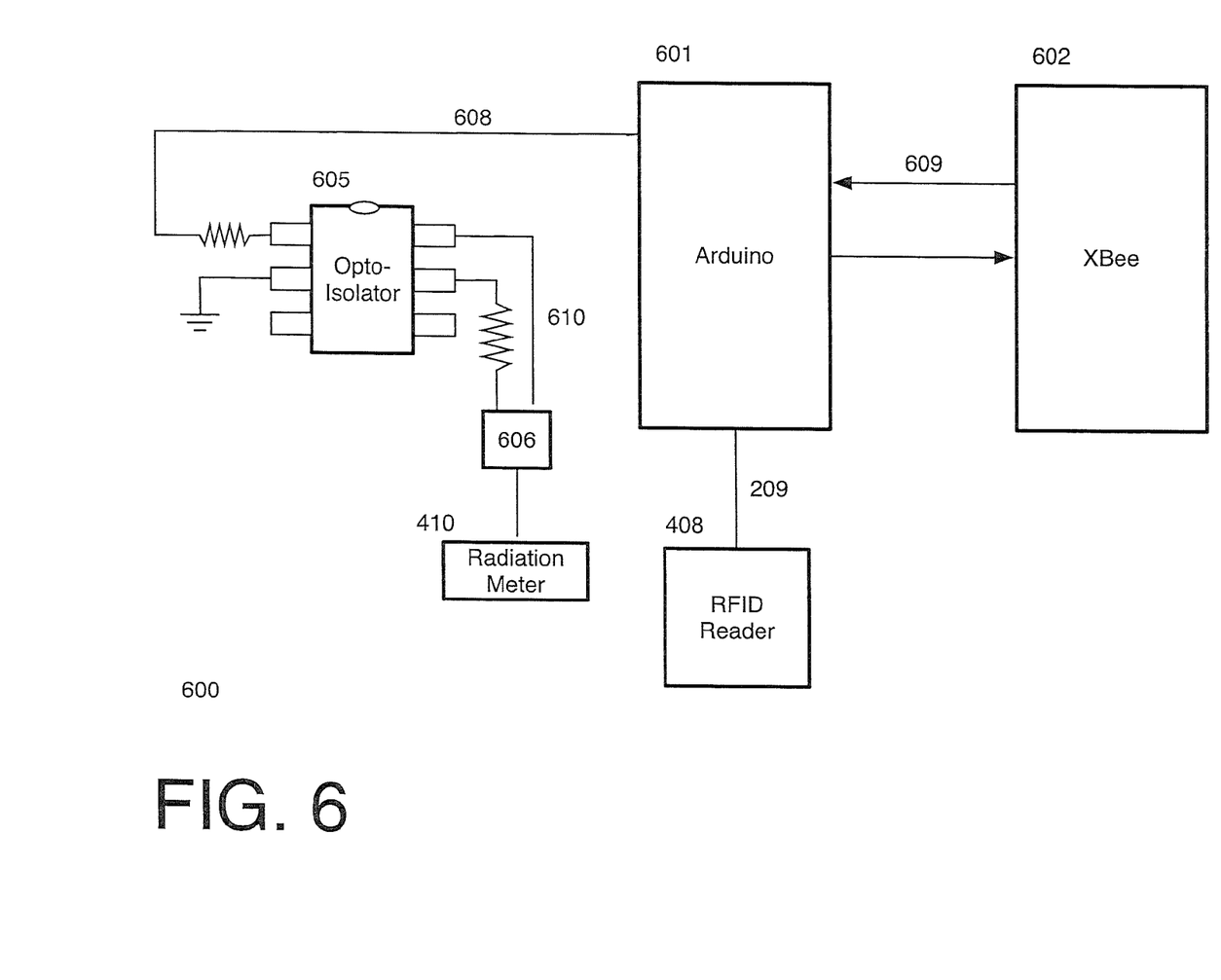
FIG. 6 depicts an exemplary system for the processing and control elements of a simulator which could be created based on this disclosure in the field of training first responders on the proper use of a radiation survey meter.

FIG. 6 depicts an exemplary system [600] for the processing and control elements of a simulator [103] which could be created based on this disclosure in the field of training first responders on the proper use of a radiation survey meter. The main system elements are an Arduino microcontroller [601] that processes the data signal [209] from an RFID reader [408]. The microprocessor [601] communicates [609] with the XBee [602] communications chip (a specific example of a receiver [415]). The output [608] of the Arduino microprocessor drives the input of a high-voltage optoisolator [605] which in turn drives [610] a high voltage solid state relay [606]. The contacts of the relay serve as the input to the radiation meter. The Arduino microcontroller [601] receives control signals [609] from the XBee wireless communication module [602] as well as from the RFID reader [408]. Depending on the scenario defined by the scenario generator application running in the microcontroller [601] the output of the Arduino [608] could indicate high or low radiation counts.

Note that, in the exemplary system of FIG. 6, while some components of that system are the same as discussed in the context of FIG. 4, the architecture used in FIG. 6 does not directly correspond to that discussed in the context of FIG. 4. For example, in FIG. 6, the single element Geiger tube signal generator [407] is illustrated as two elements: the high voltage optoisolator [605] and the high voltage solid state relay [606]. Similarly, FIG. 6 illustrates a single Arduino microprocessor [601], rather than separating the functions of the RFID interpreter [406] and the scenario generator [207]. Other variations, both from the architecture of FIG. 4, and from the architecture of FIG. 6, are possible, and will be immediately apparent to one of ordinary skill in the art based on the disclosure set forth herein. Accordingly, both FIG. 4, and FIG. 6 (as well as the other figures in this document) should be understood as being illustrative only, and not limiting.

To provide a further illustration of how the technology described herein could be implemented, and how such implementations could improve upon what was available in the prior art, submitted herewith is a computer program listing appendix comprising code files which might be used in implementing the disclosed technology, or which are illustrative of the prior art. In that appendix, "DecoderProcessor.txt" and "Simulator.txt" are files containing code written in the ARDUINO language which can be used to perform analog audio decoding and conversion into a digital signal. "OpenSerialPort.txt" and "SimulatorSerial.txt" illustrate a small fraction of the type of low level JAVA code which would have been used to integrate simulation into courseware materials using prior art approaches.

Figure 7:
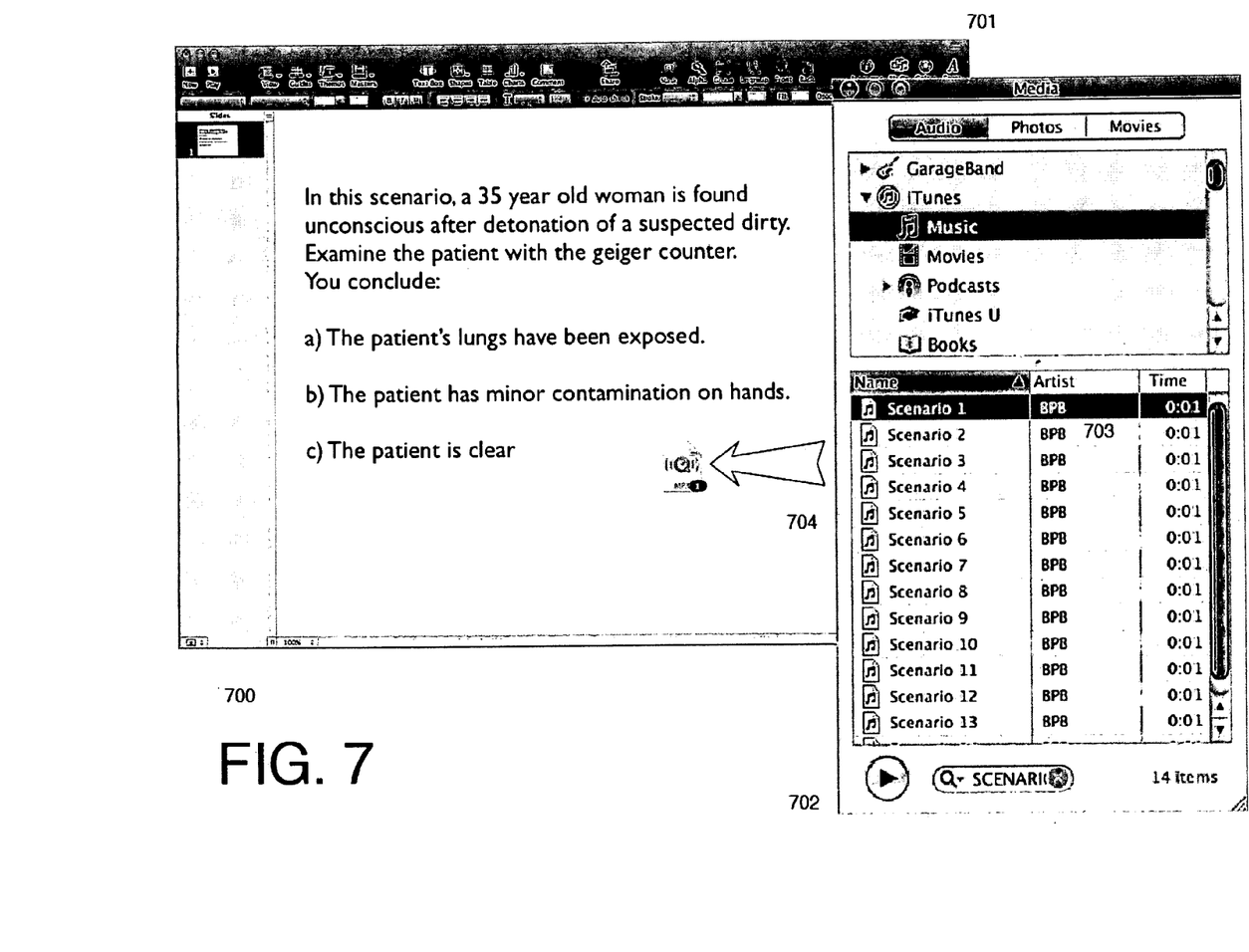
FIG. 7 depicts the general form of a typical interface which could be used to create educational materials with the integrated simulation in a preferred embodiment of the technology disclosed herein.

FIG. 7 depicts the general form of a typical interface which could be used to create educational materials with the integrated simulation in a preferred embodiment of the technology disclosed herein. In this example [700], an off-the-shelf slide presentation manager [701] is used to create a multiple choice question in which the user is directed to use a Geiger counter simulator to examine a patient. To configure the external simulator hardware, the author uses a multimedia select panel [702] to select the appropriate scenario, in this example, Scenario 1. The author drags the file [703] to the open panel, signifying that the audio file [704] is to be played upon opening the panel. Similarly, the author could drag or otherwise assign particular audio files to buttons, sliders, other interface elements, as well as regions on the current screen or of objects displayed on the screen. In the preferred embodiment described here, the author needn't understand the form or format of the file, but simply select the proper audio media file from a documented list of scenarios. That is, the author has, as a reference at the time of authoring, a listing of the characteristics of each scenario, in terms of how the external hardware simulator is configured. Although not shown in this example, a scenario file could similarly be associated with the press of a button, mouse over, slider movement, or other user interaction. Note that, in these examples of DTMF audio signals, the courseware author is not precluded from using standard interface audio, such as button-down clicks, the swish of a finger drag on a touch-sensitive screen, or computer-generated speech. This is due to the relative immunity to noise and potentially interfering audio of DTMF signals based on their nature as pairs of signals which are detected as being present simultaneously. For example, DTMF number 2 is composed of a 1336 Hz tone paired with a 697 Hz tone.

Figure 9:
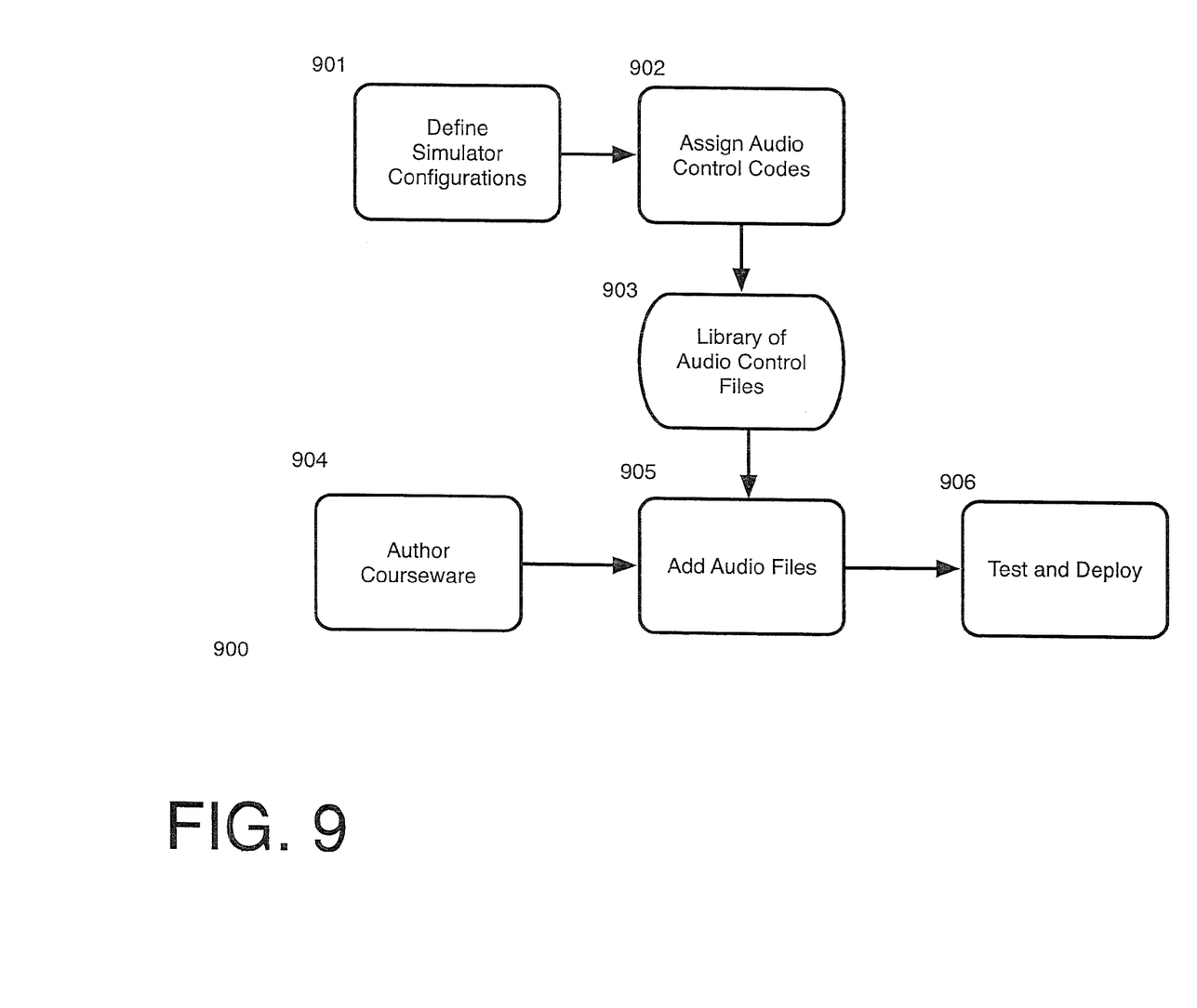
FIG. 9 depicts a flow chart of a process for creating educational materials using a system which could be implemented based on this disclosure.

FIG. 9 depicts a flow chart of a process [900] for creating educational materials using a system which could be implemented based on this disclosure. In the process of FIG. 9, someone familiar with the various simulator configurations would define the range of configurations possible [901]. In most cases, these simulator configurations will be pre-programmed into the simulation equipment at the time it is created. For example, in the case where a mannequin with embedded RFID tags is used to simulate a victim of a dirty bomb attack, the simulation equipment would likely come pre-programmed with instructions defining specific types of injury caused by the attack (e.g., in scenario one, areas over RFID tags 1, 12 and 15 should correspond to high radioactivity, in scenario two, areas over RFID tags 3, and 21 should correspond to medium radioactivity, etc). In such a case, simulator configurations could be defined [901] by identifying which of those pre-programmed configurations would be most likely to be useful if integrated into the courseware (e.g., if the simulator was pre-programmed with 1,000 different configurations, the individual familiar with those configurations could identify a subset of configurations which would have the highest potential to be salient to the courseware to be created).

Of course, other approaches are also possible. For example, simulation equipment may be provided which includes the capability of generating user defined scenarios using control signals. In the case of a mannequin with embedded RFID tags used to simulate a victim of a dirty bomb attack, the simulation equipment could be configured to receive control signals indicating levels of radiation which should be reported for different RFIDs (e.g., for a mannequin with 40 embedded RFIDs, the equipment could be configured to accept an 8 bit signal where the first 6 bits identified a particular RFID tag, and the last two bits identified the level of radiation which should be reported for that tag). In such a case, simulator configurations could be defined [901] by creating different combinations of radiation readings for the RFIDs, then saving the control signals necessary for those combinations as scenarios. Still further variations (e.g., approaches which combine the steps described above, possibly with one or more prior art steps as well) are possible and will be immediately apparent to those of ordinary skill in the art in light of this disclosure, and so the description set forth above should be understood as being illustrative only, and not limiting.

Next, after the simulator configurations have been defined [901], control signals which would be sent to a scenario generator are paired with the configurations [902], thereby creating a set of data associating control signals with simulator configurations [903]. Depending on the implementation, these control signals could be provided by various sources. For example, a third party, including the manufacturer of the simulator, could supply the codes, though they could also be provided by the individual who defined the configurations [901], or by the courseware author.

Once the control files have been paired with the configurations, in the process of FIG. 9, a domain expert author creates courseware [904] which would be integrated with a simulator. To define this integration, the author could simply select the appropriate audio file from the library and add the file to the courseware [905]. The sound can be set to play upon entering a window or area, in response to a button down, mouse movement, or other user event. The courseware and control signals are then tested and deployed [906]. Of course, it should be understood that, while the disclosed technology could allow steps such as shown in FIG. 9 to be performed by different people or entities, it is also possible that one or more of the roles discussed in the context of those steps could be combined. For example, the step of defining simulator configurations [901] could be performed by the manufacturer of the simulator, or by the courseware author, rather than by an additional knowledgeable party as discussed above. Accordingly, the discussion of different entities performing steps such as illustrated in FIG. 9 should be understood as being illustrative only, and not limiting.

Figure 8:
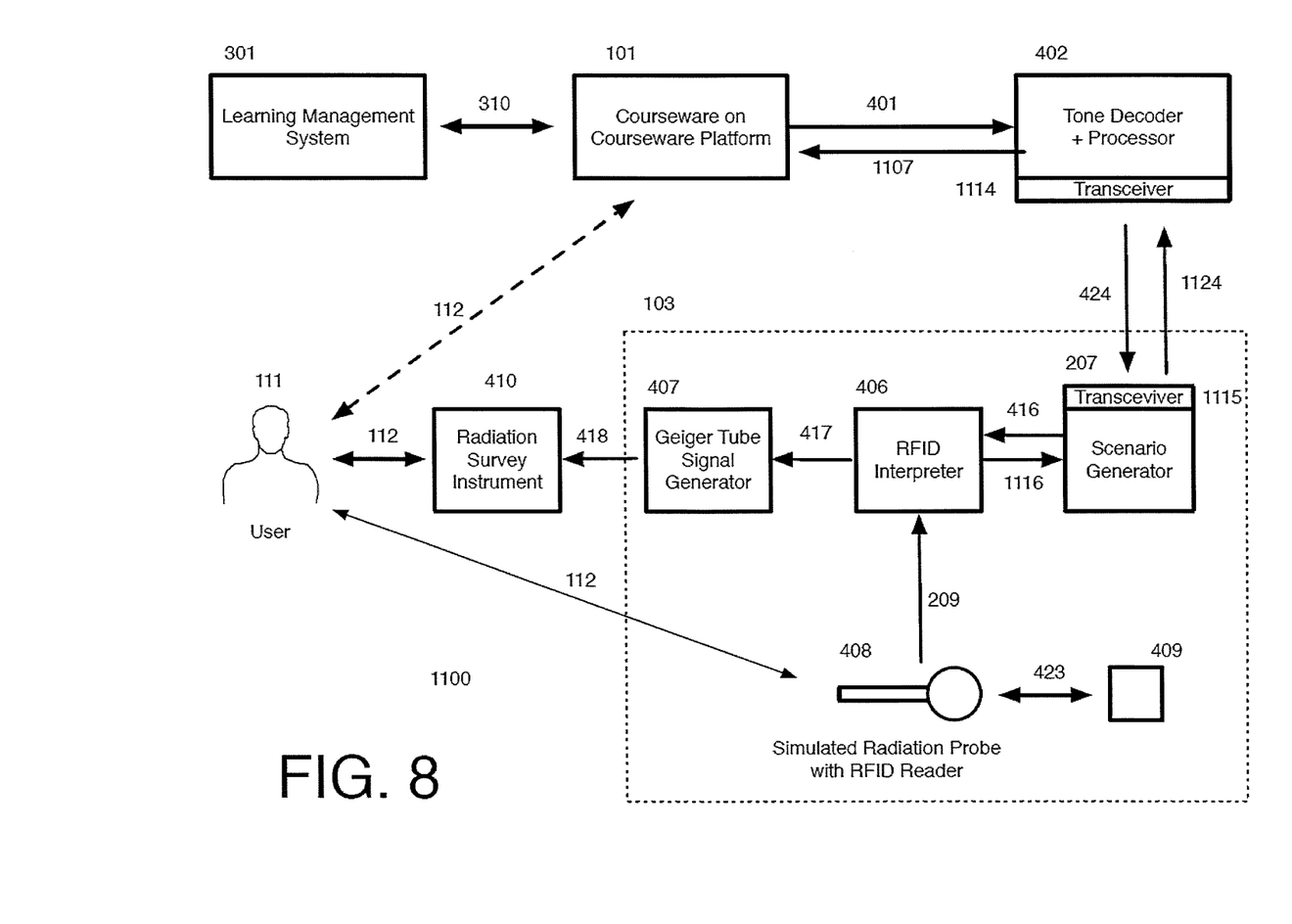
FIG. 8 depicts an architecture supporting bidirectional flow of information.

It should also be understood that variations on the architectures of FIGS. 1-6 are not limited to variations in the devices used in specific implementations, or how specific implementations could be deployed in practice. Instead, it should be understood that systems having different flows of information and control could also be implemented by those of ordinary skill in the art without undue experimentation in light of this disclosure. For example, as illustrated in FIG. 8, it is possible that approaches such as described above could be implemented to support a bidirectional flow of information and control between the simulator and the courseware. As discussed below, this could be accomplished, without modification of the courseware, by mimicking keyboard input to the courseware. For example, if the courseware expects a given input from the keyboard to move to the next stage of the simulation, then that input can be generated by a microcontroller in the tone decoder+processor [402], which would act as a sending component by communicating a native input signal [1107] to the courseware on the courseware platform [101]. Many microcontrollers can be configured to serve as USB keyboard equivalents, and some, such as the Arduino UNO, come preconfigured with this capability.

Turning now to FIG. 8, as indicated by the similarity of figure numbers and labels between that figure and FIG. 4, the architecture of FIG. 8 can be used to train first responders on the proper use of a radiation survey meter. However, unlike in FIG. 4, FIG. 8 includes signal flows not only from the courseware on the courseware platform [101], through the simulator [103], to the user [111], but also from the user [111], through the simulator [103], and back to the courseware on the courseware platform [101]. To illustrate, consider the scenario in which a courseware author wishes to have the students using the courseware practice examining victims of a dirty bomb attack for radiation exposure. In this scenario, as in the discussion of FIG. 4, the RFID interpreter [406] could interpret the data signals [209] from the simulated radiation probe [408] and communicate appropriate radiation levels [417] to a Geiger tube signal generator [407]. However, the RFID interpreter [406] could also send its interpretation of those signals [1116] to the scenario generator [207]. The scenario generator [207] could use that input [1116] to determine whether the student had examined the simulated victim and found all areas of radiation exposure (e.g., each area of exposure could have a unique level of radiation, and the scenario generator could be configured to determine when all levels of radiation had been detected). Once the student had completed the simulated examination, the scenario generator [207] could generate a digital feedback signal [1124] which it would send, via its transceiver [1115] to the transceiver [1114] of the tone decoder and processor [402]. The tone decoder and processor [402] would then convert the feedback signal [1124] to a native input [1107] (e.g., a specific keyboard input which the courseware author had indicated would trigger the courseware to continue) for courseware on the courseware platform [101]. This could then be used to allow the simulator [103] to drive operation of the courseware without requiring the courseware author to make any low level code changes to support the simulator integration.

Variations on the basic approach to integrating simulator feedback into courseware described above are also possible. For example, the discussion above explained how the same RFID interpreter [406] output could be used to drive both the Geiger tube signal generator [407] and the feedback from the scenario generator [207]. However, it is possible that, in some cases, the RFID interpreter [406] would send different information to the Geiger tube signal generator [407] and the scenario generator [207]. For instance, when sending the information [416] to configure the RFID interpreter [406], the scenario generator [207] could send both information indicating radiation levels to send to the Geiger tube signal generator [407], and information indicating actions being made by the student interacting with the simulated radiation probe [408] (e.g., identifying information showing an RFID which was being read by the simulated probe [408], which identifying information might or might not correspond to the radiation levels being communicated to the Geiger tube signal generator [407]).

As an example of another type of variation, in some cases, instead of simply sending a feedback signal [1124] indicating that the student had completed a task, in some implementations, the feedback signal [1124] might indicate a particular series of acts completed by the student. To illustrate how this might take place, consider that, as described previously, a simulator [103] in some implementations be configured with predefined scenarios representing specific patterns of simulated data. As a converse of this, to support providing feedback or for other reasons, some simulators could be configured to recognize predefined sequences of student actions which correspond to particular tasks (e.g., a student examining a victim's torso will take readings from RFIDs 1, 3, 4, and 7; a student examining a victim's legs will take readings from RFIDs 2, 9 and 12; etc). These actions could be stored in a buffer in the scenario generator [207] until a complete sequence of actions had been recognized, at which point a feedback signal [1124] representing that sequence (e.g., a unique number for the sequence) could be sent.

Once the tone decoder and processor [402] (which, as will be apparent to one of ordinary skill in the art, may be configured to decode and process information other than audio information) had received the signal indicating the particular series of acts, it could use it to generate a particular native input signal [1107] to be sent to the courseware on the courseware platform [101]. The particular native input signal [1107] to be generated in response to detection of a particular series of acts could be determined in a variety of ways. For example, in some embodiments, in the same way as there might be sound files indicating scenarios for the simulator, there might also be sound files indicating sequences of actions which, when detected, should result in a native input signal [1107] indicating completion (e.g., a keyboard input of <enter>, if enter is used in a particular lesson to move from one screen to another). Of course, more complicated types of control are also possible. For example, in some implementations, a courseware author could use existing test creation tools to create a multiple choice scenario with the choices corresponding to sequences of actions which could be performed using the simulator. In such an implementation, the courseware author could then indicate that, when an appropriate sequence of actions was detected, a native input signal corresponding to the choice for that sequence (e.g., a signal indicating depression and release of the 'A' key on a keyboard) should be generated. In general, using techniques such as described herein, a courseware author can be given the ability to tie any type of native input signal to any type of user interaction with a simulator. In this manner, a courseware author can be allowed to fully integrate simulation into courseware materials even if the courseware author is not able to engage in the type of low level programming which would allow direct communication between the courseware and the simulator.

Other types of variation in bi-directional communication are also possible. For example, in the architecture of FIG. 8, bi-directional communication is achieved through a scenario generator [207] sending a feedback signal [1124] to the tone decoder and process [402]. However, this type of communication through the scenario generator [207] is certainly not necessary for bi-directional communication, and some implementations supporting bi-directional communication may dispense with it entirely. For example, instead of using a signal from the scenario generator [207], some implementations might simply send the normal device input signal [210] intended for the reporting device [204] to both the reporting device [204] and a translation unit [102], and would rely on the translation unit [102] to perform any processing necessary to generate the native input signal [1107] (e.g., buffering inputs, recognizing sequences, etc) and to act as a sending component by communicating that signal on to the courseware on the courseware platform [101]. As another type of additional variation, in some implementations, rather than following the architecture of FIG. 8, the functions performed by single components of FIG. 8 could be split into multiple components (e.g., the tone decoder and processor [402] could be split into two components, one for outgoing data flows, and one for incoming data flows which could act as a sending component by communicating the native input signal [1107] to the courseware on the courseware platform [101]).

Of course, variations on the above disclosure are not limited to implementations of bidirectional communication. For example, the above disclosure generally focused on implementations in which a peripheral [206] was paired with a reporting device [204]. However, such pairing is not a required when implementing the disclosed technology. For example, a student could be provided with a peripheral [206] that would interact with its environment (e.g., a simulated scalpel for surgical training) without being provided with a corresponding reporting device [204]. Similarly, a student could be provided with a reporting device [204] which does not require a separate peripheral [206] for data collection (e.g., the student could be required to interact with a pulse monitor which could directly measure a simulated pulse in a mannequin's arm). Other similar variations will be immediately apparent to those of ordinary skill in the art, and could be implemented by such artisans without undue experimentation based on this disclosure.

In light of variations such as described above, the protection accorded by this document, or any document claiming the benefit of this document, should not be limited to the material explicitly disclosed. Instead, such protection should be understood to be defined by the claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "adapt" in the context of "adapting content" should be understood to refer to the ability to automatically fit the content presentation to the user.

When used in the claims, "based on" should be understood to mean that something is determined at least in part by the thing that it is indicated as being "based on." When something is completely determined by a thing, it will be described as being "based EXCLUSIVELY on" the thing.

When used in the claims, to "configure" a device should be understood to include providing the device being "configured" (e.g., a computer) with specific data (which may include instructions, such as commonly encoded in firmware, software, or data files) which can be used in performing the specific acts the device is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "control signal" should be understood to refer to a signal that defines the operation of a simulator in the form it is received by the simulator.

When used in the claims, "courseware" should be understood to refer to software running on a mobile, portable, or fixed computing device, for the purpose of engaging the user in an interactive activity.

When used in the claims, "learning content management system" should be understood to refer to software for managing learning content across an organization's various training development areas. It provides developers, authors, instructional designers, and subject matter experts the means to create and re-use e-learning content and reduce duplicated development efforts.

When used in the claims, "learning management system" should be understood to refer to a software application for the administration, documentation, tracking, and reporting of training programs, classroom and online events, e-learning programs, and training content.

When used in the claims, "means for creating the control signal based on the native signal from the courseware platform" should be understood as an element set forth using the format specified in 35 U.S.C. §112 ¶ 6 where the function is "creating the control signal based on the native signal from the courseware platform" and the corresponding structure includes a translation unit, such as illustrated in FIGS. 1, 2, 3, 4, 5 and 8, and as described in the corresponding text.

When used in the claims, "means for providing normal device input signals based on interaction with a peripheral" should be understood as an element set forth using the format specified in 35 U.S.C. §112 ¶6, where the function is "providing normal device input signals based on interaction with a peripheral" and the corresponding structure includes simulator components such as those illustrated in FIG. 6, identified as the control interpreter or signal generator in FIG. 3, identified as the RFID interpreter and Geiger tube signal generator in FIGS. 4 and 8, or identified as the scenario generator of simulator in FIG. 2, or described in the corresponding text.

When used in the claims, "native input signal" should be understood to refer to input which is received from a user as part of a platform's normal user interface. For example, in a computer designed to receive input from a keyboard, the signals indicating what key on the keyboard a user had pressed would be "native input signals" for the computer.

When used in the claims, the term "native signal" should be understood to refer to output that is presented to a user as part of a platform's normal user interface. For example, in a video game system designed to play images on a screen, play sound through speakers, and generate vibration in a controller, the visual, audio and haptic signals would be the "native signals" for the video game system.

When used in the claims, a "native signal element" should be understood to refer to an discrete and identifiable item corresponding to a native signal. For example, if a native signal is a particular sound, then an audio file encoding that sound would be a corresponding "native signal element."

When used in the claims, the term "normal device input signal" should be understood to refer to the signals applied to the input of the device during its normal operation.

When used in the claims, an "opto-isolator" should be understood to refer to a device which transfers electrical signals by utilizing light waves to provide coupling with electrical isolation between its input and output.

When used in the claims, a "peripheral" should be understood to refer to a device which is designed to work with, but is not integrated into, a second device. For example, a probe used to gather data for a radiation meter is a "peripheral" of the radiation meter. To illustrate the types of peripherals, physical probe which measures radiation that is reported by the radiation meter is an example of a "real peripheral," a physical probe which measures some proxy data that is used to cause a radiation meter to report radiation data is an example of a "simulated peripheral," and a non-physical (e.g., existing only in software) probe which is used to measure data (e.g., radiation in a virtual environment) that is used to cause a radiation meter to report radiation data is an example of a "virtual peripheral."

When used in the claims, the term "processor" should be understood to refer to a device or group of devices capable of performing one or more logical and/or physical operations on data to produce a result. A processor may include, for example, a single-core or multi-core microcontroller or microcomputer, configured as an embedded processor or as a part of a mobile, portable, or desktop computer.

When used in the claims, the term "scenario" should be understood to refer to a pattern of findings or events related to a specific event or condition.

When used in the claims, "simulator" should be understood to refer to an electro-mechanical system that can be used as a surrogate device or environment in which real or simulated devices can be used.

When used in the claims, "solid state relay" should be understood to mean a device in which a small control signal (not used in the same sense as defined above) is used to control a larger load current or voltage.

When used in the claims "unmodified reporting device" should be understood to refer to a device which provides data to a user based on signals set from a simulator, and which operates in the same manner as if it were providing data to the user based on real signals.

Accordingly, I claim:

1. A machine comprising:
   a) a courseware platform for executing courseware and comprising a first processor, wherein:
      i) the courseware configures the courseware platform to perform functions comprising generating a native signal;
      ii) the courseware platform is communicatively coupled to a first translation unit;
      iii) the courseware platform is configured to communicate the native signal to the first translation unit;
   b) the first translation unit, wherein:
      i) the first translation unit comprises a second processor;
      ii) the first translation unit is communicatively coupled to a simulator;
      iii) the first translation unit is configured to create a control signal based on the native signal from the courseware platform; and
      iv) the first translation unit is configured to communicate the control signal to the simulator;
   c) the simulator, wherein:
      i) the simulator comprises a third processor and a memory;
      ii) the memory stores a plurality of scenarios; and
      iii) the simulator is configured to activate a scenario from the plurality of scenarios based on the control signal from the first translation unit;
   wherein:
   A) the simulator is configured to generate a feedback signal based on interaction with a peripheral while the scenario is active;
   B) the machine is configured to generate a native input signal based on the feedback signal; and
   C) the machine comprises a sending component separate from the courseware platform configured to communicate the native input signal to the courseware platform.

2. The machine of claim 1, wherein:
   a) the simulator comprises a means for providing normal device input signals based on interaction with a peripheral; and
   b) the simulator is configured to communicate the normal device input signals to an unmodified reporting device.

3. The machine of claim 2, wherein:
   a) the means for providing normal device input signals based on interaction with the peripheral comprises:
      i) an opto-isolator; and
      ii) a high voltage solid state relay comprising contacts connected in a circuit as shown in FIG. 6;
   b) the unmodified reporting device comprises a radiation meter; and
   c) the contacts of the high voltage solid state relay provide the normal device input signal to the radiation meter;
   wherein the normal device input signal has a form of a Geiger-Mueller tube output signal.

4. The machine of claim 1, wherein:
   a) the courseware platform is communicatively coupled to a learning management system; and
   b) the courseware configures the courseware platform to adapt content presented to a user based on communications from the learning management system.

5. The machine of claim 1, wherein the sending component is a translation unit selected from the group consisting of:
   a) the first translation unit; and
   b) a second translation unit comprising a fourth processor.

6. The machine of claim 1 wherein the native signal is a signal selected from the group consisting of:
   a) an audio signal;
   b) a haptic signal; and
   c) a video signal.

7. The machine of claim 1, wherein the courseware platform is communicatively coupled to the first translation unit via a wireless communication link.

8. The machine of claim 1, wherein the translation unit comprises a DTMF decoder and a processor.

9. The machine of claim 1 wherein the peripheral is a virtual peripheral.

10. The machine of claim 1 wherein the peripheral is a simulated peripheral.

11. The machine of claim 1 wherein the peripheral is a real peripheral.

\* \* \* \* \*